(12) United States Patent
Shibasaki (10) Patent No.: US 12,306,515 B2
(45) Date of Patent: May 20, 2025

(54) LENS APPARATUS AND IMAGE PICKUP APPARATUS

(71) Applicant: CANON KABUSHIKI KAISHA, Tokyo (JP)

(72) Inventor: Go Shibasaki, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 18/165,552

(22) Filed: Feb. 7, 2023

(65) Prior Publication Data

US 2023/0266644 A1     Aug. 24, 2023

(30) Foreign Application Priority Data

Feb. 18, 2022   (JP) ................................ 2022-023378

(51) Int. Cl.
*G03B 17/14*     (2021.01)
(52) U.S. Cl.
CPC ........ *G03B 17/14* (2013.01); *G03B 2217/007* (2013.01)
(58) Field of Classification Search
CPC .................................................. G03B 17/14
See application file for complete search history.

(56) References Cited

U.S. PATENT DOCUMENTS

| | | | | |
|---|---|---|---|---|
| 8,363,149 B2 * | 1/2013 | Yumiki | ................ | H04N 23/667 |
| | | | | 348/340 |
| 8,545,117 B2 * | 10/2013 | Urakami | ................ | G03B 17/00 |
| | | | | 396/530 |
| 10,432,833 B2 * | 10/2019 | Moriyama | ........... | G03B 17/566 |

FOREIGN PATENT DOCUMENTS

JP        2016057513 A      4/2016

* cited by examiner

*Primary Examiner* — Leon W Rhodes, Jr.
(74) *Attorney, Agent, or Firm* — Canon U.S.A., Inc. IP Division (57) ABSTRACT

A lens apparatus including: a main body configured to house an optical system; and a mount part detachably mountable to the main body and a camera apparatus, in which the mount part includes a first electric contact part that contacts an electric contact part of the camera apparatus and a second electric contact part electrically conductive with the first electric contact part, in which the main body comprises an electric substrate and a third electric contact part electrically conductive with the electric substrate, in which the second electric contact part and the third electric contact part are in contact with each other by connecting the main body and the mount part to each other.

16 Claims, 14 Drawing Sheets

LENS APPARATUS AND IMAGE PICKUP APPARATUS

BACKGROUND

Technical Field

The aspect of the embodiments relates to a lens apparatus and an image pickup apparatus.

Description of the Related Art

In a lens apparatus mounted on a camera through a mount part, electric power is supplied from the camera to the lens apparatus and communication such as a control information from the camera to the lens apparatus and a state information from the lens apparatus to the camera is carried out through electric contacts provided in the mount. In the lens apparatus, an electric board equipped with a controller, a storage device and the like, and the electric contacts of the mount part are connected by conductive cables. On the other hand, while there are many types of camera mounts, there is a lens apparatus which is mountable to multiple types of cameras by rearranging the mount part of the lens apparatus. Japanese Patent Application Laid-Open No. 2016-57513 discloses a lens apparatus in which a connector of wiring from an electric contact provided in a mount part and a connector of wiring from an electrical board part to each other at an intermediate part (a wiring housing part).

In the lens apparatus disclosed in Japanese Patent Application Laid-Open No. 2016-57513, an operation of replacing the mount is complicated because a disconnection of a connector in the wiring housing part and a removal of the mount part in the lens apparatus must be carried out in order.

SUMMARY

A lens apparatus includes: a main body configured to house an optical system; and a mount part detachably mountable to the main body and a camera apparatus, in which the mount part includes a first electric contact part that contacts an electric contact part of the camera apparatus and a second electric contact part electrically conductive with the first electric contact part, in which the main body comprises an electric substrate and a third electric contact part electrically conductive with the electric substrate, in which the second electric contact part and the third electric contact part are in contact with each other by connecting the main body and the mount part to each other.

Further features of the present invention will become apparent from the following description of exemplary embodiments with reference to the attached drawings.

DESCRIPTION OF THE EMBODIMENTS

The exemplary embodiment of the present invention is described in detail below based on embodiments illustrated in FIGS. 1 to 13.

Embodiment 1

Figure 1:
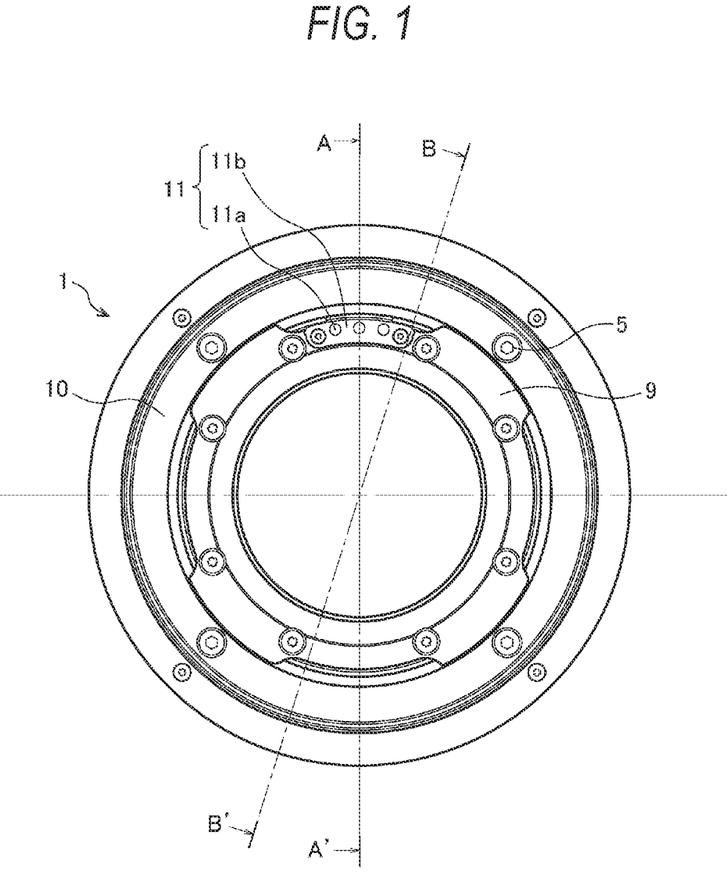
FIG. 1 is a front view of an image side of a lens apparatus according to Embodiment 1 of the present invention.
Figure 2:
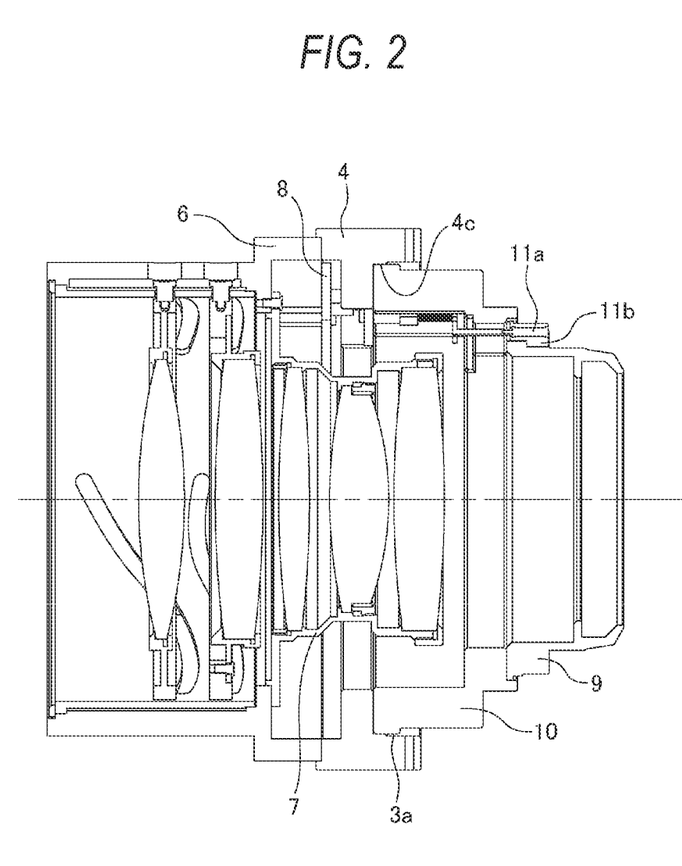
FIG. 2 is a cross-sectional view of the lens apparatus viewed along an A-A' line in FIG. 1.
Figure 3:
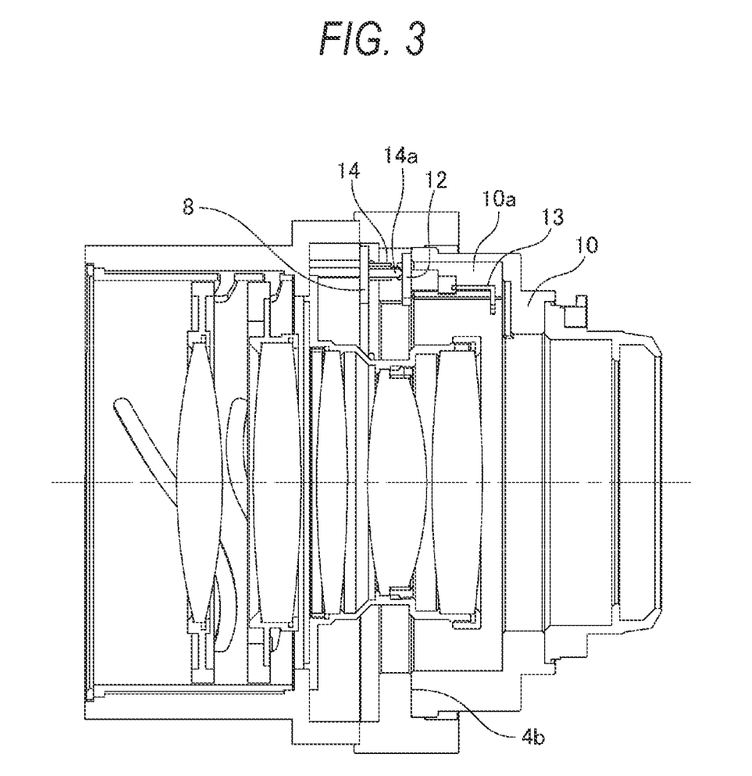
FIG. 3 is a cross-sectional view of the lens apparatus viewed along a B-B' line in FIG. 1.
Figure 4:
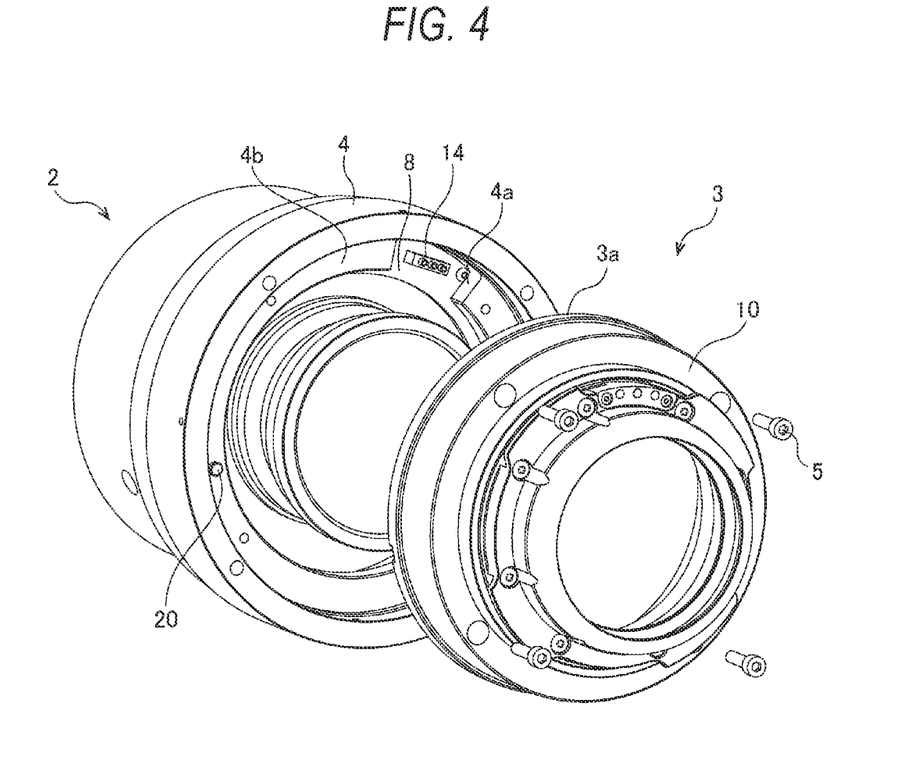
FIG. 4 is an exploded perspective view of the mount part of the lens apparatus according to Embodiment 1.

FIG. 1 is a front view of a state of the first mount type of the lens apparatus 1 to which the present invention is applied as viewed from the image plane side. FIG. 2 is a side sectional view of a mount part corresponding to an A-A section shown in FIG. 1, and FIG. 3 is a side sectional view of the mount part corresponding to a B-B section shown in FIG. 1. In FIGS. 2 and 3, the object side corresponds to the left side and the image plane side corresponds to the right side. FIG. 4 shows the exploded perspective view of the mount part of the lens apparatus 1.

The lens apparatus 1 is a lens apparatus of a replaceable type that is attachable to and detachable from a camera body, and is connected to a mount on the camera body side (not shown) by a mount unit 3 (mount part) to be used. The mount unit 3 is fixed to a first fixed barrel 4 by a plurality of screws 5 which are mount fixing members. An engagement part 4c of the first fixed barrel 4 is engaged with an outer circumference part 3a of the mount unit 3, and when the mount unit 3 is fixed to the first fixed barrel 4, the coaxial position of both is kept.

A second fixed barrel 6 is fixed to the object side of the first fixed barrel 4 by a screw not shown. The backlash of the engagement part between the first and second fixed barrels 4 and 6 is small enough so that their coaxial state is kept when the first and second fixed barrels 4 and 6 are fixed by screws. A lens barrel 7 and an electric component mounting board (electric board) 8 are fixed to the second fixed barrel 6. In the lens barrel 7, a plurality of optical elements are held by a plurality of presser rings. Other optical systems and operating members (not shown) are connected to the second fixed barrel 6, and an entire part disposed on the object side of the mount unit 3 including the first fixed barrel 4 and the second fixed barrel 6 is referred to as a lens body (body part) 2.

The mount unit 3 consists of a mount ring 9 having bayonet claws that engage the camera mount, a coupling ring 10, an electric contact unit 11, an intermediate contact substrate 12, and screws connecting them. As shown in FIG. 1, an electric contact unit 11 is fixed to the mount ring 9 on the image plane side surface in an upper portion thereof. The electric contact unit 11 is composed of a plurality of metal electric contact members 11a and a resin contact block 11b in which the electric contact members 11a are insert-molded. When the lens apparatus 1 is connected to the camera body for use, the electric contact members 11a and the contacts of the camera (not shown) can be connected so that power is supplied and communication is performed through the electric contact unit 11.

Figure 5:
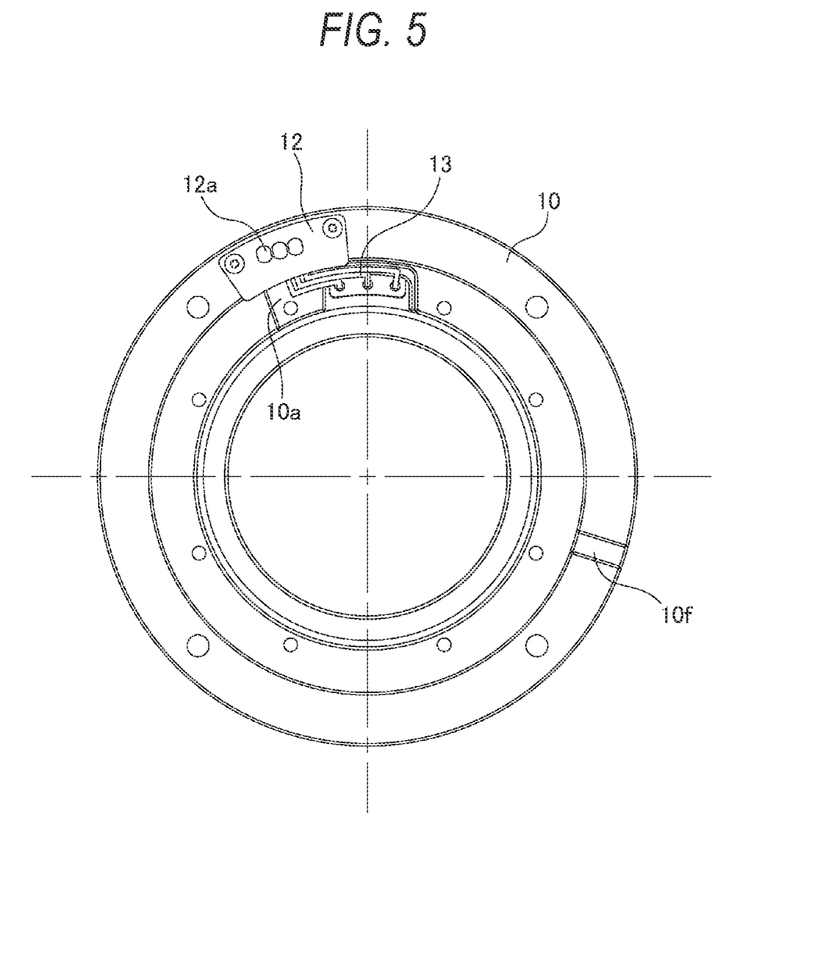
FIG. 5 is a front view of a mount unit of a first mount type viewed from an object side.

FIG. 5 is a front view of the mount unit 3 viewed from the object side. As shown in FIG. 5, a plurality of conductive patterns 12a are mounted on a surface of the object side of the intermediate contact substrate 12 fixed to the coupling ring 10 in the vicinity of an upper portion thereon. The intermediate contact substrate 12 and the electric contact unit 11 are connected to each other by conductive cables 13 so that each conductive pattern 12a is electrically connected to each electric contact member 11a of the aforementioned electric contact unit 11. On the inner circumferential surface of the coupling ring 10, a concave portion 10a is provided to accommodate the conductive cables 13 that connect the intermediate contact substrate 12 and the electric contact unit 11 to each other. The mounting surface to the lens body is provided with a groove 10f to engage with a pin 20 protruding from the mounting surface (contact surface) 4b of the first fixed barrel 4 and to precisely regulate a relative angular relationship between the lens body 2 and the mount unit 3 around optical axis.

On the other hand, on the image plane side of the lens body 2, the first fixed barrel 4 is provided with a notch 4a in a position opposite to the intermediate contact substrate 12 on the mount unit 3 as shown in FIG. 4, and the intermediate contact unit 14 mounted on the electric component mounting substrate 8 is exposed through the notch 4a. The intermediate contact unit 14 is composed of electric contact members 14a which are multiple metal pin-shaped contact contacts and are assembled by resin members into a single mounted component. Each pin-shaped electric contact member 14a has a structure in which a biasing force acts in an optical axis direction when it is connected to the mount unit 3 due to a biasing structure by a coil spring (not shown) inside, and a tip is expandable and contractable within a predetermined stroke while maintaining electric conductivity as a contact. Each electric contact member 14a of the intermediate contact unit 14 has a positional relationship to abut on the conductive patterns 12a of the intermediate contact substrate 12.

Figure 6:
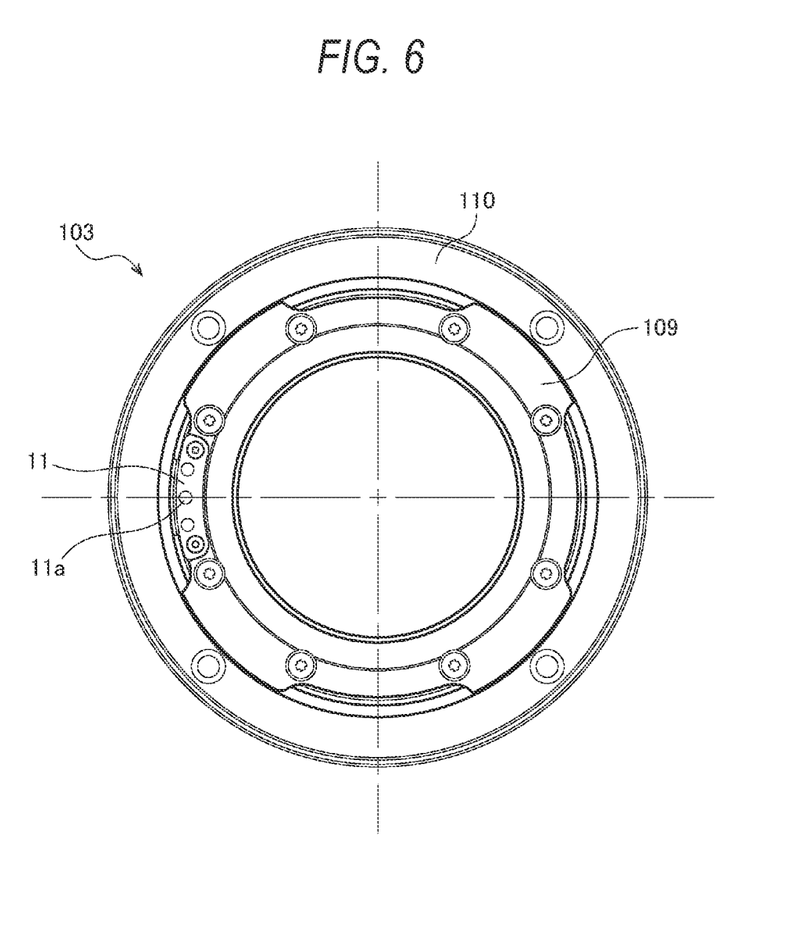
FIG. 6 is a front view of the mount unit of a second mount type viewed from the image plane side.
Figure 7:
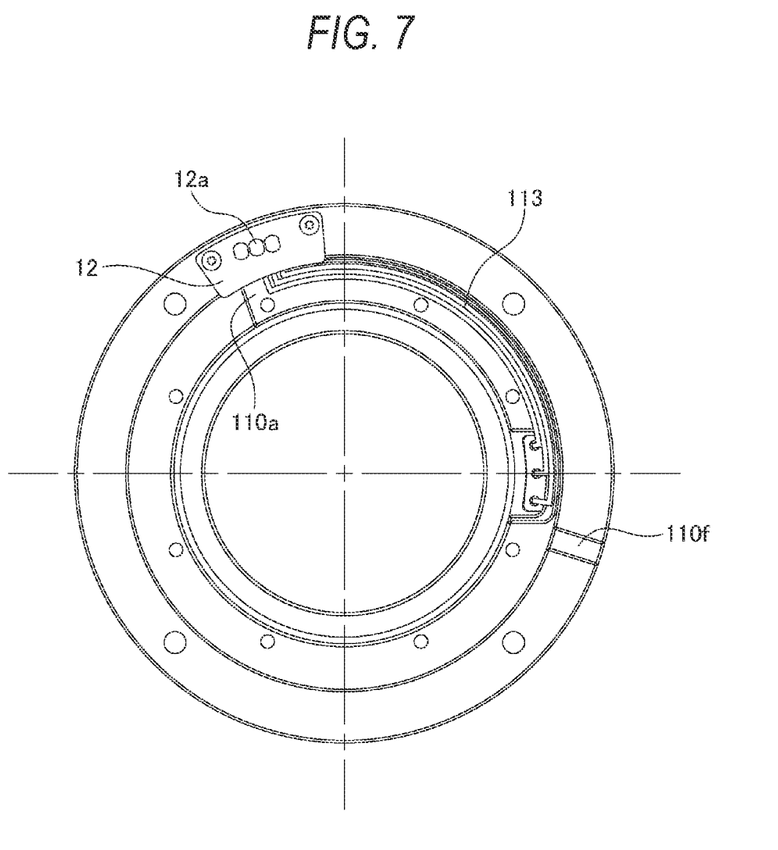
FIG. 7 is a front view of the mount unit of the second mount type viewed from the object side.

FIG. 6 is a front view of the mount unit 103 of the second mount type as seen from the image plane side, where the position of the electric contact with the camera body is different from that of the first mount type, and FIG. 7 is a front view as seen from the object side.

The mount unit 103 consists of a mount ring 109 provided with bayonet claws that engage the camera mount, a coupling ring 110, an electric contact unit 11, an intermediate contact substrate 12, and screws connecting them. As shown in FIG. 6, an electric contact unit 11 is fixed to the mount ring 109 on the left of the image plane side surface. Multiple conductive patterns 12a are mounted on a surface of the object side of the intermediate contact substrate 12 fixed in the vicinity at an upper side of the coupling ring 110. The intermediate contact substrate 12 and the electric contact unit 11 are connected each other by conductive cables 113 so that each conductive pattern 12a is electrically connected to each electric contact member 11a of the aforementioned electric contact unit 11. On the inner circumferential surface of the coupling ring 110, a concave portion 110a is provided to accommodate a conductive cable connecting the intermediate contact substrate 12 and the electric contact unit 11. The mounting surface to the lens body is provided with a groove 110f which engages with the pin 20 protruding from the mounting surface 4b of the first fixed barrel 4 and to precisely regulate a relative angular relationship between the lens body 2 and the mount unit 103 around the optical axis.

An operation of replacing the mount in the lens apparatus configured as above is described below.

Here, we consider a selective reconfiguration from the first mount type for mounting on a first camera device to the second mount type for mounting on a second camera device.

First, remove all the screws 5 that secure the mount unit 3 of the first mount type to the lens body 2, then remove the mount unit 3 from the lens body 2 in an optical axis direction. In the electric connection between the intermediate contact unit 14 and the intermediate contact substrate 12, when the mount unit 3 is fixed, the electric contact members 14a of the intermediate contact unit 14 remain in a state of contacting the conductive patterns 12a of the intermediate contact substrate 12 by the biasing force of the coil spring described above. However, since the electric contact member 14a cannot extend beyond a predetermined stroke, when the mount unit 3 is moved away from the lens body 2 in the optical axis direction, the electric contact part does not come into contact with the lens body from a distance greater than an extending stroke of the electric contact member 14a. That is, the mount unit 3 can be completely removed from the lens body 2 as it is.

Then, when the mount unit 103 of the second mount type is moved closer to the first fixed barrel 4 of the lens body 2 from the image plane side in the optical axis direction, the electric contact members 14a of the intermediate contact unit 14 first abut on the conductive patterns 12a of the intermediate contact substrate 12. When the mount unit 103 is further pushed toward the object side from this state, the tip of the electric contact members 14a shrinks against the aforementioned biasing force of the coil spring, and the mount unit 103 comes into contact with the mounting surface 4b of the first fixed barrel 4. With the mount unit 103 in contact with the mounting surface 4b of the first fixed barrel 4, the screws 5 removed once are tightened again to complete the mount replacement operation.

When changing from the second mount type to the first mount type, the above operations are performed in reverse order.

In the lens apparatus of the present embodiment configured as described above, the divided surfaces connecting the lens body 2 and the mount units 3 and 103 are close to the divided surfaces of the intermediate contact unit 14 and the intermediate contact substrate 12, and the electric connection method is based on a contact between conductors with biasing forces. Therefore, an operation of removing the mount units 3 and 103 from the lens body 2 and an operation of disconnecting the electric connections need not be performed independently and sequentially, and the disconnection of the electric connections can be simultaneously realized by a single operation of removing the mount units 3 and 103. Similarly, for a mounting operation, there is no need to prepare separately the operation of mounting the mount units 3 and 103 on the lens body 2 and an operation of connecting the electric connections, and the connection of the electric connections can be realized simultaneously by a single operation of mounting the mount units 3 and 103.

Fixation between the lens body 2 and the mount units 3 and 103 is performed by the screws 5. For any of the mount units, disassembly of the mount unit is not involved as part of the mount replacement operation.

Furthermore, since the method of electric connection between the lens body 2 and the mount units 3 and 103 is based on contact between electric conductors with biasing forces, there is no risk of damaging the conductive cable at the electric connection as in a conventional technology.

As described above, according to the lens apparatus according to this embodiment, the mount having the communication contact with the camera body can be replaced by a simple operation, and the lens apparatus suitable for repeating the replacement operation can be provided.

In this embodiment, it is assumed that the first and second mount types are disposed in areas separated from each other, where phases of positions of the electric contacts with the camera device around the optical axis are different from each other, and communication contents are identical to each other. However, the present invention is also applicable to mount types with different communication contents by providing a switch or the like separately.

Although the above described description has been performed in embodiments with two types of replaceable mount types, the present invention is also applicable to support three or more replaceable mount types.

In this embodiment, the electric contact members 14a is configured to expand and contract in the optical axis direction by the biasing force of the coil spring, but the conductive patterns 12a of the intermediate contact substrate 12 may be configured to expand and contract in the optical axis direction by a biasing member.

Embodiment 2

Figure 8:
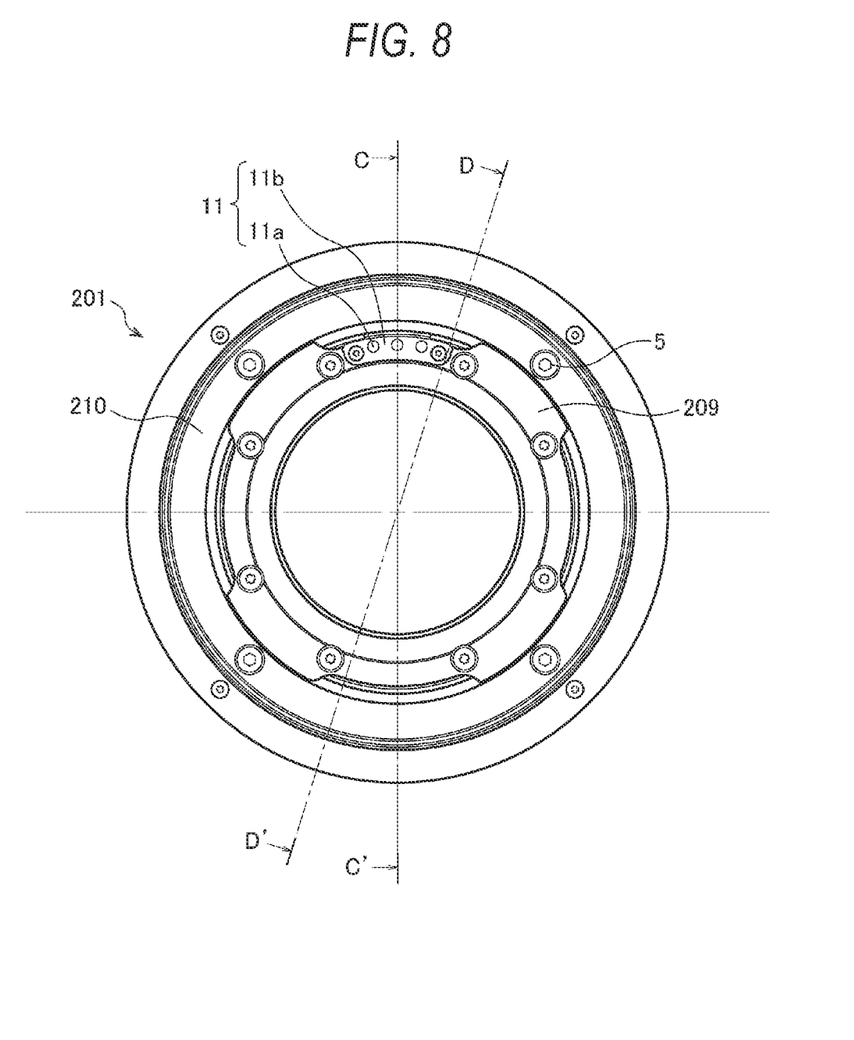
FIG. 8 is a front view of a lens apparatus according to Embodiment 2 viewed from the image plane side.
Figure 9:
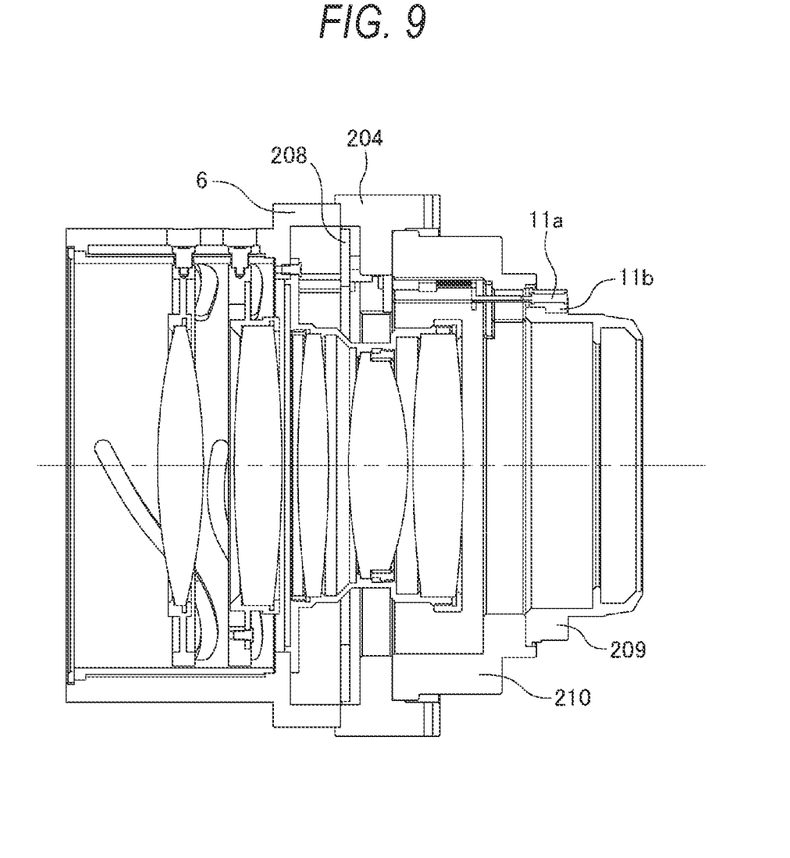
FIG. 9 is a cross-sectional view of the lens apparatus viewed along a C-C' line in FIG. 8.
Figure 10:
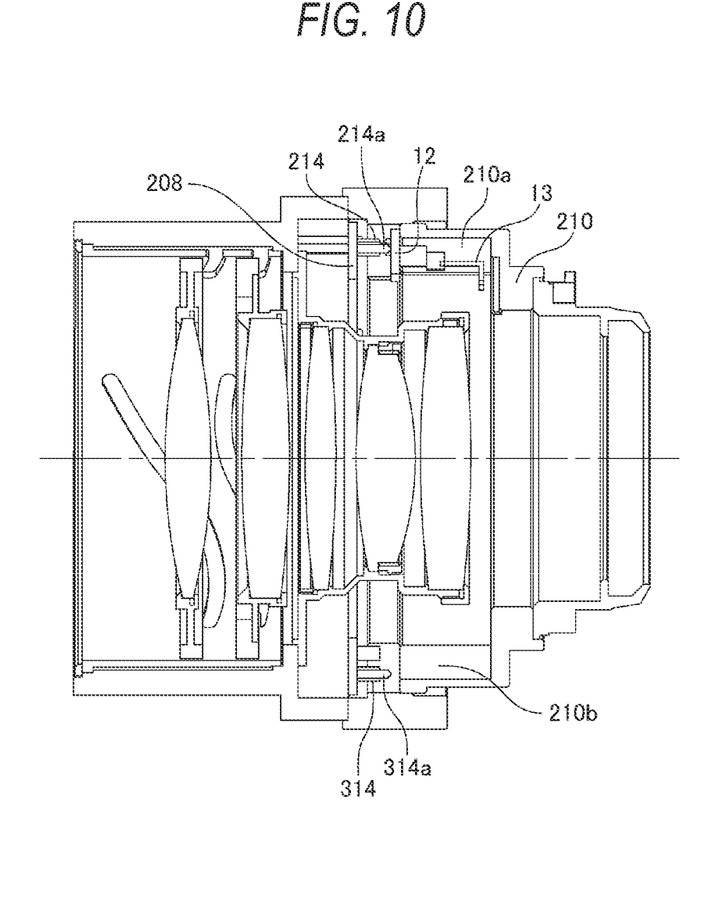
FIG. 10 is a cross-sectional view of the lens apparatus viewed along a D-D' line in FIG. 8.
Figure 11:
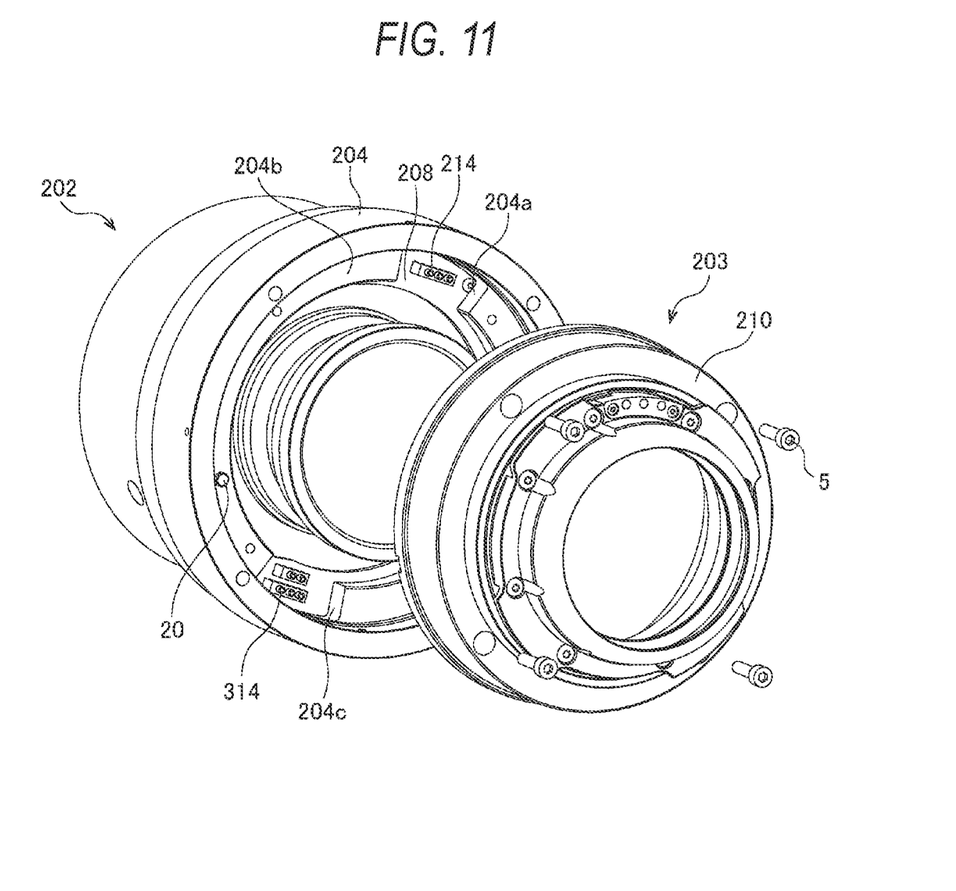
FIG. 11 is a partial perspective view of the mount part of the lens apparatus according to in Embodiment 2.

FIG. 8 is a front view as seen from the image plane side in the second embodiment of the lens apparatus to which the present invention is applied. FIG. 9 is a side sectional view of the mount part corresponding to the C-C' section shown in FIG. 8, and FIG. 10 is a side sectional view of the mount part corresponding to the D-D' section shown in FIG. 8. FIG. 11 shows an exploded perspective view of the mount part of the lens apparatus 201. The same symbol as in Embodiment 1 indicates the same member.

The differences in configuration from Embodiment 1 are described below.

The mount unit 203 is fixed to the first fixed barrel 204 by a number of screws 5 which are mount fixing members. The mount unit 203 consists of a mount ring 209 having bayonet claws that engage the camera mount, a coupling ring 210, an electric contact unit 11, an intermediate contact substrate 12, and screws connecting them. Multiple conductive patterns 12a are mounted on a surface on the object side of the intermediate contact substrate 12 fixed in the vicinity of an upper portion of the coupling ring 210. The intermediate contact substrate 12 and the electric contact unit 11 are connected to each other by conductive cables 13 so that each conductive pattern 12a is electrically connected to each electric contact member 11a of the aforementioned electric contact unit 11. On an inner circumferential surface of the coupling ring 210, a concave portion 210a is provided to accommodate the conductive cables 13 connecting the intermediate contact substrate 12 and the electric contact unit 11. In addition, a concave portion 210b is provided in a lower vicinity of a surface to which the intermediate contact substrate 12 of the coupling ring 210 is fixed.

Figure 12:
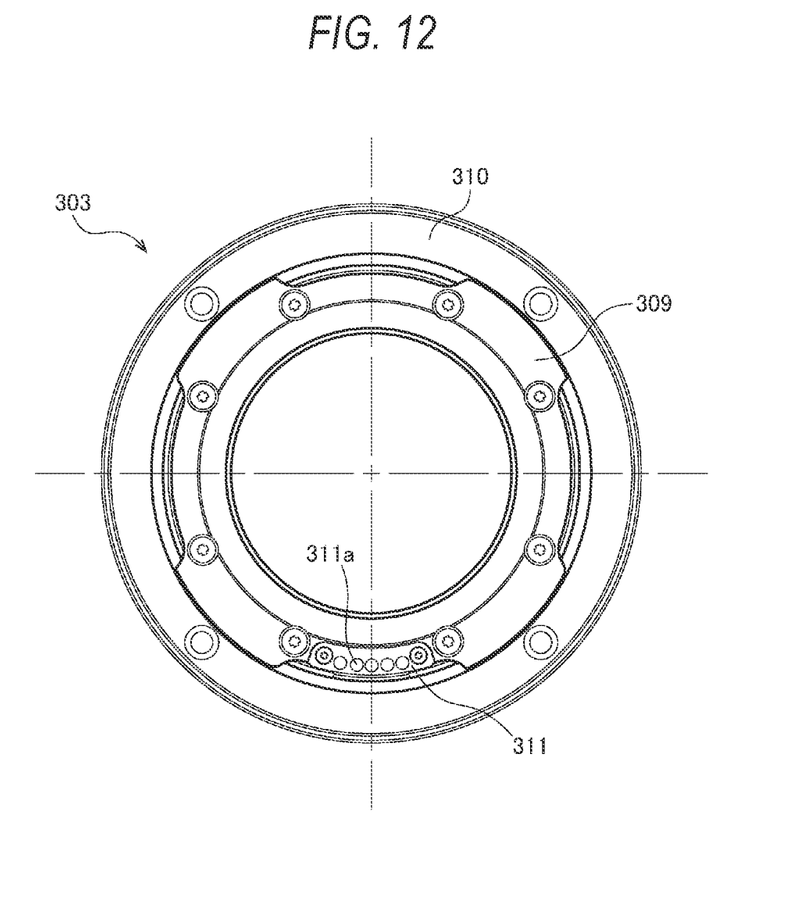
FIG. 12 is a front view of a mount unit of a second mount type viewed from the image plane side.
Figure 13:
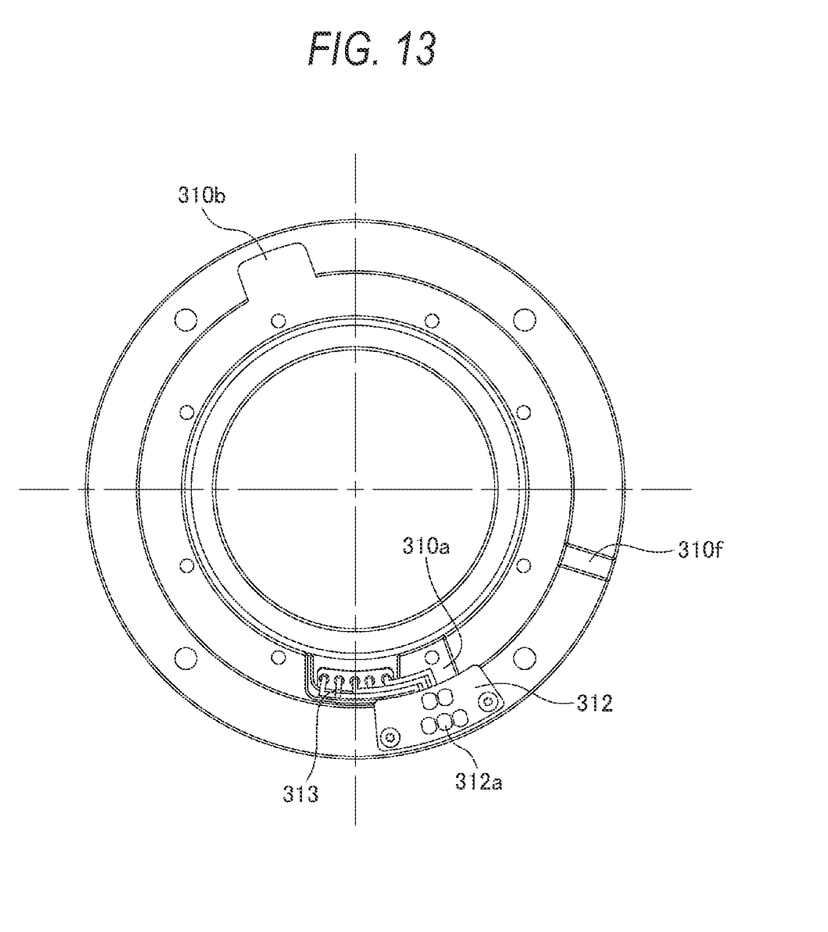
FIG. 13 is a front view of the mount unit of the second mount type viewed from the object side.

FIG. 12 is a front view of the mount unit (second mount) 303 of the second mount type, which differs from the first mount type in position of electric contacts with the camera body and the number of contacts, as seen from the image plane side, and FIG. 13 is a front view as seen from the object side.

The mount unit 303 consists of a mount ring 309 having bayonet claws that engage a camera mount, a coupling ring 310, an electric contact unit 311, an intermediate contact substrate 312, and screws connecting them. As shown in FIG. 12, an electric contact unit 311 is fixed to the mount ring 309 at a lower part of the image plane side surface of the mount ring 309. The intermediate contact substrate 312 fixed to the coupling ring 310 near the lower part thereof is provided with a plurality of conductive patterns 312a on the surface of the object side. The intermediate contact substrate 312 and the electric contact unit 311 are connected to each other by conductive cables 313 so that each conductive pattern 312a is electrically connected to each electric contact member 311a of the aforementioned electric contact unit 311. On the inner circumferential surface of the coupling ring 310, a concave portion 310a is provided to accommodate the conductive cables 313 connecting the intermediate contact substrate 312 and the electric contact unit 311. Furthermore, a concave portion 310b is provided in the vicinity of an upper part of the surface to which the intermediate contact substrate 312 of the coupling ring 310 is fixed. The mounting surface to the lens body is provided with a groove 310f to engage a pin 20 which protrudes from the mounting surface (contact surface) 204b of the first fixed barrel 204 to precisely regulate the relative angular relationship between the lens body 202 and the mount unit 303 around the optical axis.

On the other hand, on an image-side surface of the lens body 202, the first fixed barrel 204 is provided with notches 204a and 204c at two locations opposite to the intermediate contact substrates 12 and 312. Two intermediate contact units 214 and 314 mounted on the electrical component mounting substrate 208 are exposed through notches 204a and 204c at two locations. Intermediate contact units 214 and 314 each consist of electric contact members 214a and 314a, respectively, which are two or more metal pin-shaped contact points, and are assembled by resin members into a single mounted component. Each of the pin-shaped electric contact members 214a, 314a has a biasing structure of a coil spring (not shown) inside, so that a biasing force acts in the optical axis direction when it is connected to the mount unit 303, and the tip is expandable or contractable within a predetermined stroke while maintaining electrical conductivity as a contact. The electric contact members 214a and 314a of the intermediate contact units 214 and 314 have positional relationship in contact with the conductive patterns 12a and 312a of the intermediate contact substrates 12 and 312, respectively. The concave portion 210b of the mount unit 203 has the same phase as the intermediate contact unit 314, and the concave portion 310b of the mount unit 303 has the same phase as the intermediate contact unit 214.

The operation of replacing the mount in a lens apparatus configured as above is described below.

Here, we consider rearranging from the first mount type to the second mount type.

First, remove all screws 5 that secure the mount unit 203 of the first mount type to the lens body 202, then remove the mount unit 203 from the lens body 202 in the optical axis direction. Since the electric contact members 214a cannot extend beyond a predetermined stroke, the mount unit 203 can be completely removed from the lens body.

Then, when the mount unit 303 of the second mount type is moved closer to the first fixed barrel 204 of the lens body from the image plane side in the optical axis direction, the electric contact member 314a of the intermediate contact unit 314 first abuts on the conductive pattern 312a of the intermediate contact substrate 312. When the mount unit 303 is further pushed toward the object side from this state, the tip of the electric contact member 314a shrinks against the aforementioned biasing force of the coil spring, and the mount unit 303 comes into contact with the mounting surface 204d of the first fixed barrel 204. Since the concave portion 310b is provided at a position opposite to the intermediate contact unit 214, the tip of the electric contact member 214a of the intermediate contact unit 214 is in a state where nothing is in contact with it. With the mount unit 303 in contact with the mounting surface 204d of the first fixed barrel 204, the screws 5, which was removed once, are tightened again to complete the mount replacement operation.

When changing from the second mount type to the first mount type, the above operations are performed in a reverse order.

As in the lens apparatus of Embodiment 1, in the lens apparatus of the present embodiment constructed as described above, it is not necessary to perform the operation of removing the mount units 203 and 303 from the lens body 202 and the operation of disconnecting the electric connections independently and sequentially. Disconnection of electrical connections can also be achieved simultaneously with a single operation of removing the mount units 203 and 303. Similarly, there is no need to prepare separately the operation of attaching the mount units 203 and 303 to the lens body 202 and the operation of connecting the electric connections. Connecting the electric connections can also be achieved simultaneously with a single operation of mounting the mount units 203 and 303.

In addition, since the electric connection method between the lens body 202 and the mount units 203 and 303 is based on contact between conductors with biasing forces, there is no risk of damaging the conductive cable at the electric connection as in the conventional technology.

In this embodiment, unlike the configuration of Embodiment 1, the electric contact members of the intermediate contact unit on the lens body are different between the first and second mount types. This makes it possible to have different circuit designs on the electric component mounted substrate for each mount type. Therefore, this embodiment can be applied even when the specifications such as voltage and communication content of the electric contact with the camera differ depending on the mount type.

In addition, when one of the intermediate contact units is in contact with the intermediate contact substrate, the other if the intermediate contact units is insulated with the tip of the electric contact member in a non-contact state, so it is possible to automatically determine electrically which type of mount unit is connected.

The electric contact members to be electrically connected when a mount unit of the first mount type or of the second mount type is selectively assembled may be arranged in approximately the same phase in a plane perpendicular to the optical axis. The present invention is applicable even if some electric contact members are used in common (as overlapping contact members) in two mount types.

In this embodiment, the intermediate contact unit, and the intermediate contact substrate, which are electrically connected by the first and second mount types, are arranged in different phases in a plane perpendicular to the optical axis. In this case, it is easy to distribute the connecting and fixing parts between the lens body and the mount unit in the circumferential direction. Therefore, it is possible to avoid the occurrence of deviation in connection strength. In addition, when corresponding to mount types in which the phase of the electric contact with the camera is significantly different, the phase of the electric contact with the camera and the intermediate contact substrate can be made closer, which has a benefit of easy wiring routing when assembling the mount unit.

In the explanation of the above embodiment, two types of mount are used, but the present invention is applicable to support three or more mount types.

In this embodiment, the electric contact members 214a and 314a are configured to expand and contract in the optical axis direction by the biasing force of the coil spring. However, the present invention is not limited to this, and the conductive patterns 12a, 312a of the intermediate contact substrates 12, 312 may be configured to be stretchable by a biasing member in a direction parallel to the optical axis.

In the embodiment, the electric contact members 214a and 314a are configured to expand and contract in the optical axis direction by the biasing force of the coil spring, and the conductive patterns 12a and 312a of the intermediate contact substrates 12 and 312 are configured in the plane perpendicular to the optical axis. However, the present invention is not limited to the fact that the contact surface of the electric contact is constructed in a plane perpendicular to the optical axis. A contact surface may be constructed on the circumferential surface with the optical axis at its center, to which an electric contact member configured to expand and contract in a direction perpendicular to the optical axis, constructed on the other member, contacts. Furthermore, the contact surface is not limited to being composed of a surface perpendicular to the optical axis or a circumferential surface centered on the optical axis, but may be composed of the side circumferential surface of the cone frustum with the optical axis as the axial direction, and an electric contact member that expands and contracts in a direction perpendicular to the contact surface (biasing direction) may be composed of the other member.

Figure 14:
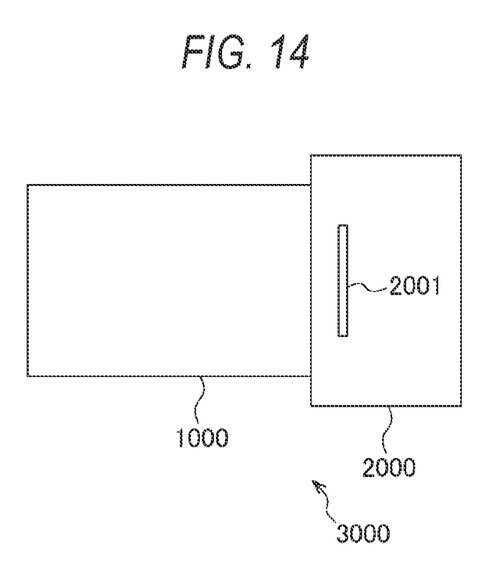
FIG. 14 is a conceptual diagram of an image pickup apparatus having the lens apparatus according to the present invention.

As shown in FIG. 14, by providing a lens apparatus 1000 of the present invention and a camera apparatus 2000 having an image pickup element 2001 picking up an image formed by the lens apparatus 1000, an image pickup apparatus that can enjoy the effect of the present invention can be realized.

Although the exemplary embodiment of the present invention has been described above, the present invention is not limited to this embodiment and various modifications and modifications can be made within the scope of its gist.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-023378, filed Feb. 18, 2022, which is hereby incorporated by reference herein in its entirety.

What is claimed is:
1. A lens apparatus comprising:
a main body configured to house an optical system; and
a mount part detachably mountable to the main body and a camera apparatus,
wherein the mount part includes a first electric contact part that contacts an electric contact part of the camera apparatus and a second electric contact part electrically conductive with the first electric contact part, wherein the main body comprises an electric substrate and a third electric contact part electrically conductive with the electric substrate, wherein the second electric contact part and the third electric contact part are in contact with each other by connecting the main body and the mount part to each other, wherein the mount part is interchangeable with a second mount part having a fourth electric contact part configured to contact an electric contact part of another camera apparatus other than the camera apparatus and a fifth electric contact part which is electrically conductive with the fourth electric contact part, wherein the fifth electric contact part and the third electric contact part contact with each other by connecting the main body and the second mount part with each other, and wherein the mount part includes a concave portion so as not to contact the electric contact part of the another camera apparatus.

2. The lens apparatus according to claim 1, wherein one of the second electric contact part and the third electric contact part is biased against the other of the second electric contact part and the third electric contact part.

3. The lens apparatus according to claim 2 further comprising a biasing member configured to bias the one of the second electric contact part and the third electric contact part to the other, wherein the biasing member is expandable and contractable in a biasing direction.

4. The lens apparatus according to claim 3, wherein the biasing direction is parallel to an optical axis.

5. The lens apparatus according to claim 3, wherein the biasing direction is perpendicular to an optical axis.

6. The lens apparatus according to claim 1, wherein the mount part is interchangeable with a second mount part having a fourth electric contact part configured to contact an electric contact part of another camera apparatus other than the camera apparatus and a fifth electric contact part which is electrically conductive with the fourth electric contact part, wherein the main body has a sixth electric contact part electrically conductive with the electric substrate, and wherein the fifth electric contact part and the sixth electric contact part contact with each other by connecting the main body and the second mount part with each other.

7. The lens apparatus of claim 6, wherein electric contacts included in the third electric contact part and electric contacts included in the sixth electric contact part include an electric contact that is commonly included in the third and sixth electric contact parts.

8. The lens apparatus according to claim 6, wherein the third electric contact part and the sixth electric contact part are arranged in regions apart from each other.

9. The lens apparatus according to claim 1, wherein the mount part and the second mount part are fixed to the main body by a common fixing member.

10. An image pickup apparatus comprising a lens apparatus and an image pickup element for picking up an image formed by the lens apparatus, wherein the lens apparatus comprises:

a main body configured to house an optical system; and a mount part detachably mountable to the main body and a camera apparatus, wherein the mount part includes a first electric contact part that contacts an electric contact part of the camera apparatus and a second electric contact part electrically conductive with the first electric contact part, wherein the main body comprises an electric substrate and a third electric contact part electrically conductive with the electric substrate, wherein the second electric contact part and the third electric contact part are in contact with each other by connecting the main body and the mount part to each other, wherein the mount part is interchangeable with a second mount part having a fourth electric contact part configured to contact an electric contact part of another camera apparatus other than the camera apparatus and a fifth electric contact part which is electrically conductive with the fourth electric contact part, wherein the fifth electric contact part and the third electric contact part contact with each other by connecting the main body and the second mount part with each other, and wherein the mount part includes a concave portion so as not to contact the electric contact part of the another camera apparatus.

11. The image pickup apparatus according to claim 10, wherein one of the second electric contact part and the third electric contact part is biased against the other of the second electric contact part and the third electric contact part.

12. The image pickup apparatus according to claim 11 wherein the lens apparatus further comprises a biasing member configured to bias the one of the second electric contact part and the third electric contact part to the other, wherein the biasing member is expandable and contractable in a biasing direction.

13. The image pickup apparatus according to claim 10, wherein the mount part and the second mount part are fixed to the main body by a common fixing member.

14. The image pickup apparatus according to claim 10, wherein the mount part is interchangeable with a second mount part having a fourth electric contact part configured to contact an electric contact part of another camera apparatus other than the camera apparatus and a fifth electric contact part which is electrically conductive with the fourth electric contact part, wherein the main body has a sixth electric contact part electrically conductive with the substrate, and wherein the fifth electric contact part and the sixth electric contact part contact with each other by connecting the main body and the second mount part with each other.

15. The image pickup apparatus of claim 14, wherein electric contacts included in the third electric contact part and electric contacts included in the sixth electric contact part include an electric contact that is commonly included in the third and sixth electric contact parts.

16. The image pickup apparatus according to claim 14, wherein the third electric contact part and the sixth electric contact part are arranged in regions apart from each other.

* * * * *